United States Patent [19]

Oliver et al.

[11] 4,430,567
[45] Feb. 7, 1984

[54] METHOD AND APPARATUS FOR NEUTRON INDUCED GAMMA RAY LOGGING FOR DIRECT POROSITY IDENTIFICATION

[75] Inventors: Donald W. Oliver; David M. Chace, both of Houston, Tex.

[73] Assignee: Dresser Industries, Inc., Dallas, Tex.

[21] Appl. No.: 227,331

[22] Filed: Jan. 22, 1981

[51] Int. Cl.³ ............................................... G01V 5/10
[52] U.S. Cl. ..................................... 250/270; 250/262
[58] Field of Search ........................ 250/270, 262, 269

[56] References Cited

U.S. PATENT DOCUMENTS 4,020,342 4/1977 Smith, Jr. et al. .................. 250/270
4,168,428 9/1979 Culver ................................. 250/263

Primary Examiner—Alfred E. Smith
Assistant Examiner—Carolyn E. Fields

Attorney, Agent, or Firm—Richard M. Byron; Patrick H. McCollum

[57] ABSTRACT

In a gamma ray well logging instrument, a neutron generator is pulsed at a predetermined rate. Each neutron burst produces gamma radiation resulting from inelastic scattering and neutron capture. The detected gamma radiations are detected by a detector system within the logging instrument. The detected pulses are transmitted to the surface electronics where pulses occurring in the inelastic interval are directed to one section of a multi-channel analyzer and pulses from the capture interval are directed to another section of the analyzer. The use of address decoders and ratio circuits enables an electrical signal to be obtained which represents the ratio of the total capture gamma ray counts within an energy range to the total inelastic gamma ray counts within the same energy range. This electrical signal is representative of the porosity of the subsurface formations being irradiated by neutrons.

11 Claims, 7 Drawing Figures

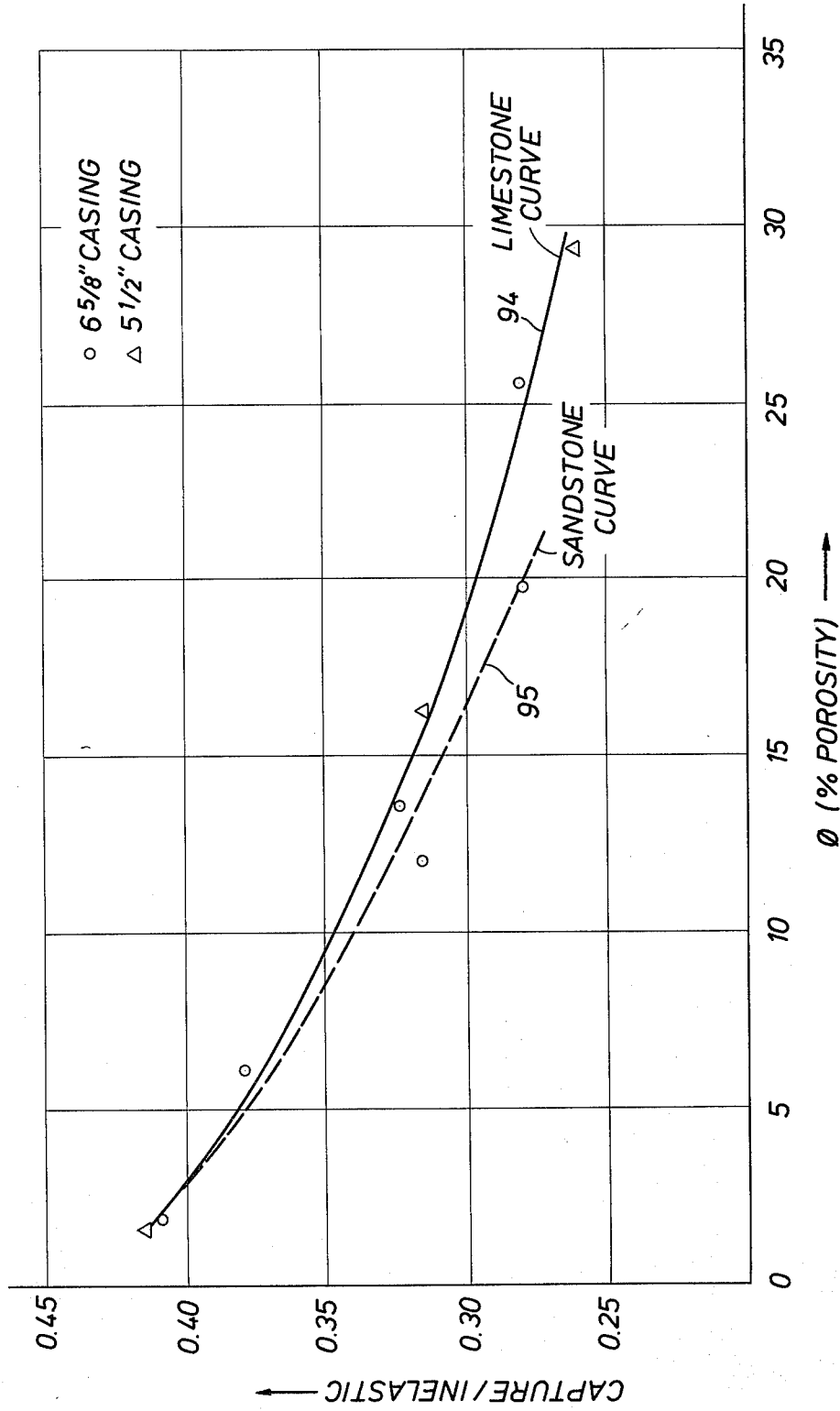

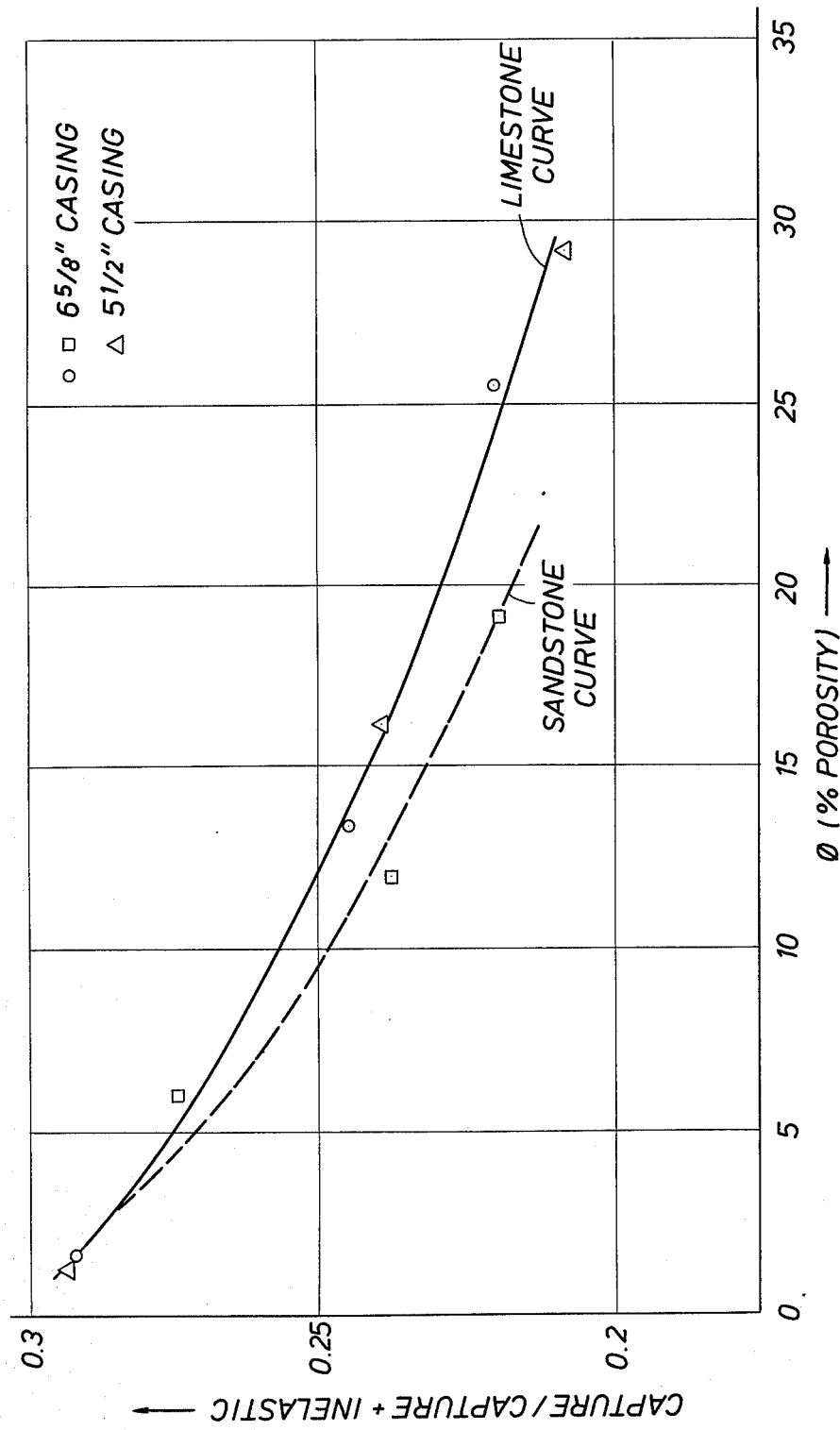

METHOD AND APPARATUS FOR NEUTRON INDUCED GAMMA RAY LOGGING FOR DIRECT POROSITY IDENTIFICATION

BACKGROUND OF THE INVENTION

This invention relates generally to radiological well logging methods and apparatus for investigating the subsurface earth formations traversed by a borehole and, more particularly, to an improved method and apparatus for pulsed neutron gamma ray logging wherein gamma rays resulting from neutron inelastic scattering and thermal neutron capture are selectively detected and the spectral distribution of the gamma rays is determined and utilized for direct porosity identification.

A number of well logging techniques in use come under the general classification of neutron induced radiological well logging. In their basic form, these techniques involve irradiating subsurface earth formations with high energy neutrons and then determining the effect of formation constituents on the irradiating neutrons by measuring gamma rays produced by inelastically scattered neutrons or the gamma rays resulting from thermal neutron capture. In the case of inelastic scattering, part of the energy lost by the neutron is released in the form of gamma rays at the instant of collision. A capture reaction is one of which the thermalized neutron is absorbed into the nucleous of an atom and ceases to exist independently. In most such capture reactions, one or more high energy gamma rays are generated.

The detection of these radioactive signals returning to the borehole can provide information as to the porosity, lithology and presence or absence of hydrocarbons within the formation. One property of subsurface formations of particular interest is porosity, which in rocks is space not occupied by solid material. In subsurface formations this pore space is ordinarily occupied by fluids which are hydrogenous in composition.

Several prior art methods have been proposed for porosity evaluation of subsurface formations by means of bombarding the formations with neutrons. An example of such prior art instrumentation is described in U.S. Pat. No. 3,621,255, issued to R. J. Schwartz, where the neutron population returning to the borehole is sampled by a pair of neutron detectors spaced at different distances on the longitudinal axis from the neutron source. Due to the necessity of providing high counting rates to reduce statistical deviation, the source-detectors spacings must be shorter than would be desired. As a result of the short spacings the counting rates of the two detectors are affected unequally by changes in porosity. Thus, this instrument will only provide a mesurement related to porosity and not a measurement of true porosity.

Another method of porosity determination using a pulsed neutron source is illustrated in U.S. Pat. No. 4,239,956, issued to D. W. Oliver and R. B. Culver, and assigned to the assignee of the present invention. The patent discloses a system whereby a carbon/oxygen ratio and a hydrogen/iron ratio are derived from fixed energy ranges within the capture gamma ray spectrum. These ratios are then combined to obtain a direct porosity indicator. Due to the complexities involved in obtaining the various abovedescribed measurements the disclosed method has been determined not to be the simplest and most reliable means of identifying formation porosity.

Accordingly, it has been proven difficult to establish an easily obtainable yet reliable measurement of true formation porosity. The present invention overcomes the deficiencies of the prior art by providing an improved method and apparatus for direct porosity identification derived from the measurement of gamma rays resulting from neutron inelastic scattering and thermal neutron capture.

SUMMARY OF THE INVENTION

The present invention provides a method and an apparatus for determining the porosity of the formation surrounding a borehole with the porosity measurement having very little dependence on formation lithology and borehole influences. A neutron generator located in a well logging instrument is pulsed at a predetermined rate. Inelastically scattered gamma rays and capture gamma rays are detected following each neutron burst at a detector located within the logging instrument. The detected pulses are transmitted to the surface electronics where pulses occurring in the inelastic interval are directed to one section of a multichannel analyzer and pulses from the capture interval to another section in the analyzer.

Circuits in the surface electronics are used to generate an electrical signal functionally related to the total inelastic gamma ray count within a single preselected energy range. Further, there is generated a second electrical signal functionally related to the total capture gamma ray count within the same preselected energy range. The first and second electrical signals are combined to provide a third electrical signal which is a direct indicator of formation porosity.

Accordingly, it is a feature of the present invention to provide a new and improved method and apparatus for measuring subsurface formation porosity;

It is yet another feature of the invention to provide a new and improved method and apparatus of indicating formation porosity that is substantially independent of formation lithology and borehole influences.

It is still another feature of the invention to provide a new and improved porosity measurement which exhibits low statistical error and increased repeatability.

The advantages of the present invention will be more readily understood by those skilled in the art from a reading of the following detailed specification and drawings.

BRIEF DESCRIPTION OF THE DRAWINGS

FIG. 6 graphically illustrates the relationship between the capture/inelastic ratio and formation porosity using the energy window in accordance with the present invention.

FIG. 7 graphically illustrates the relationship between the capture/(capture+inelastic) ratio and formation porosity using the energy window in accordance with the present invention.

DETAILED DESCRIPTION OF THE INVENTION

Figure 1:
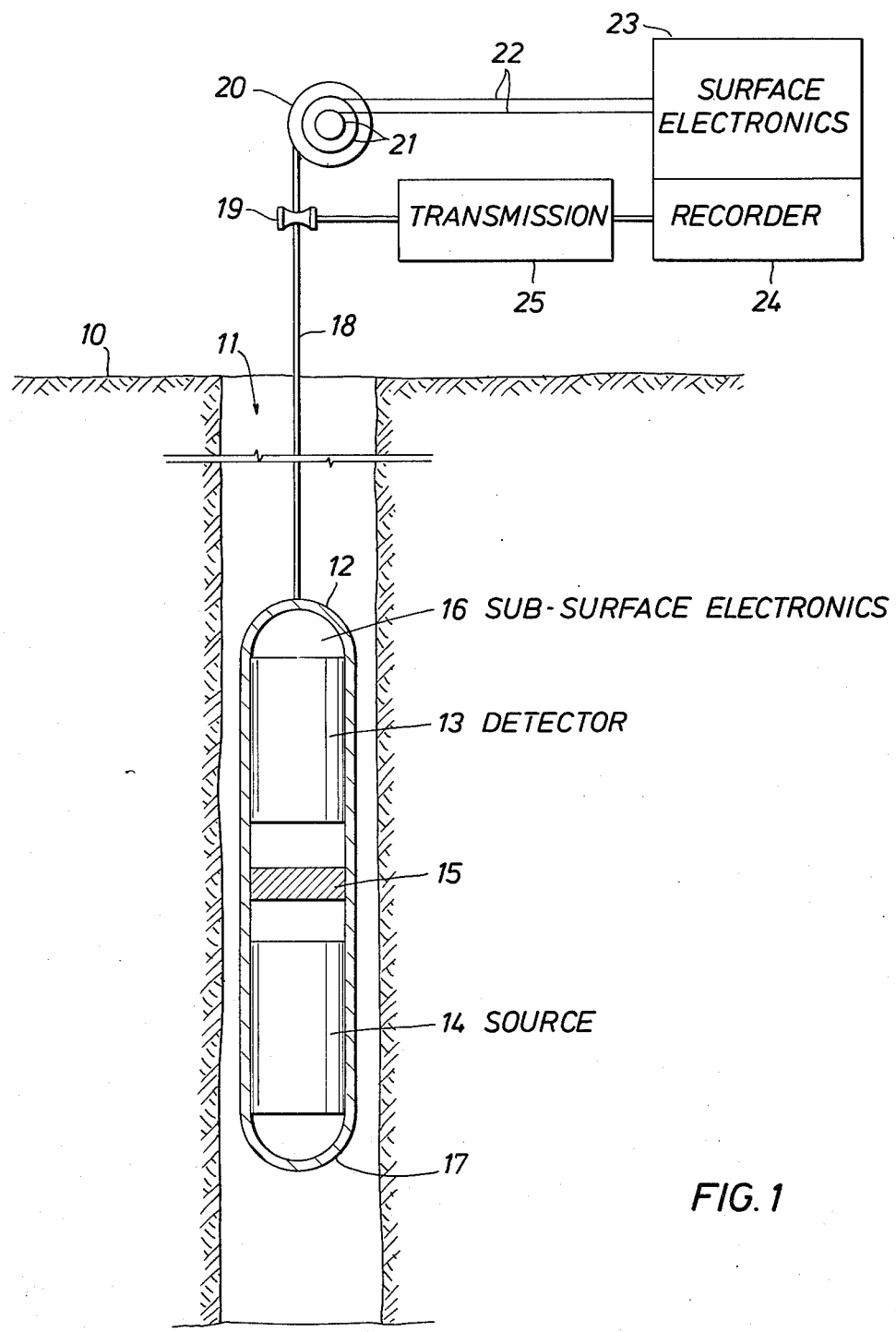
FIG. 1 is a side elevation, partly in cross section, of a borehole logging instrument in operative position and its associated surface circuitry and related equipment.

Referring now to the drawing in more detail, particularly to FIG. 1, there is illustrated schematically a radioactivity well surveying operation in which a portion of the earth 10 is shown in vertical section. A well 11 penetrates the earth's surface and may or may not be cased. Disposed within the well 11 is the subsurface instrument 12 of the well logging system. Subsurface instrument 12 comprises a detecting system 13 and a pulsed neutron source 14. A radiation shield 15 is interposed between source 14 and detector 13. Cable 18 suspends the instrument in the well and contains the required conductors for electrically connecting the instrument with the surface apparatus. The cable is wound on or unwound from drum 20 in raising and lowering the instrument 12 to traverse the well.

In making a radioactivity log of the well, instrument 12 is caused to traverse the well. Thereby neutrons from source 14 irradiate the formations surrounding the borehole and radiations influenced by the formations are detected by the detecting system 13. The resultant signals are sent to the surface through cable 18. Through slip rings 21 on the end of the drum 20, the signals are conducted by means of conductor 22 to the surface electronics 23, where such signals are processed and then recorded on the recorder 24 as explained in more detail hereinafter. Recorder 24 is driven through transmission 25 by measuring reel 19 over which the cable 18 is drawn so that recorder 24 moves in correlation with depth as the instrument 12 traverses the well. The elements are shown diagrammatically, and it is to be understood that the associated circuits and power supplies are provided in a conventional manner. It is also to be understood that the instrument housing 17 will be constructed to withstand the pressures and mechanical and thermal abuses encountered in logging a deep well and to provide adequate space within it to house the necessary apparatus and permit the transmission of radiation through it. The subsurface signals are processed in the subsurface electronics 16 as described in greater detail hereinafter.

In a well logging operation such as is illustrated by the apparatus of FIG. 1, the neutron source 14 and detector 13 in the subsurface instrument 12 are separated from the surface processing and recording equipment 23 by as much as four to five miles of logging cable which carries power and signals. Synchronization pulses must be transmitted along with the detector signals to provide the means for synchronizing the surface processing equipment with the subsurface generating and detecting system.

The sync pulse received at the surface by way of the 20,000 odd feet of logging cable commonly encountered in the well logging industry has a width of about ten microseconds due to the poor high frequency response of the cable. At low repetition frequencies, for example, 2,000 Hz or less, the transmission of a sync pulse for each neutron burst is not particularly difficult; however, at high repetition rates, for example, 20 kHz, the sync pulse represents an appreciable amount of the repetition period. If, however, the sync pulses are scaled and transmitted only one or two percent of the time, a significant improvement results since the sync is regenerated at the surface by use of a phase coherent, phase-locked loop.

Figure 2:
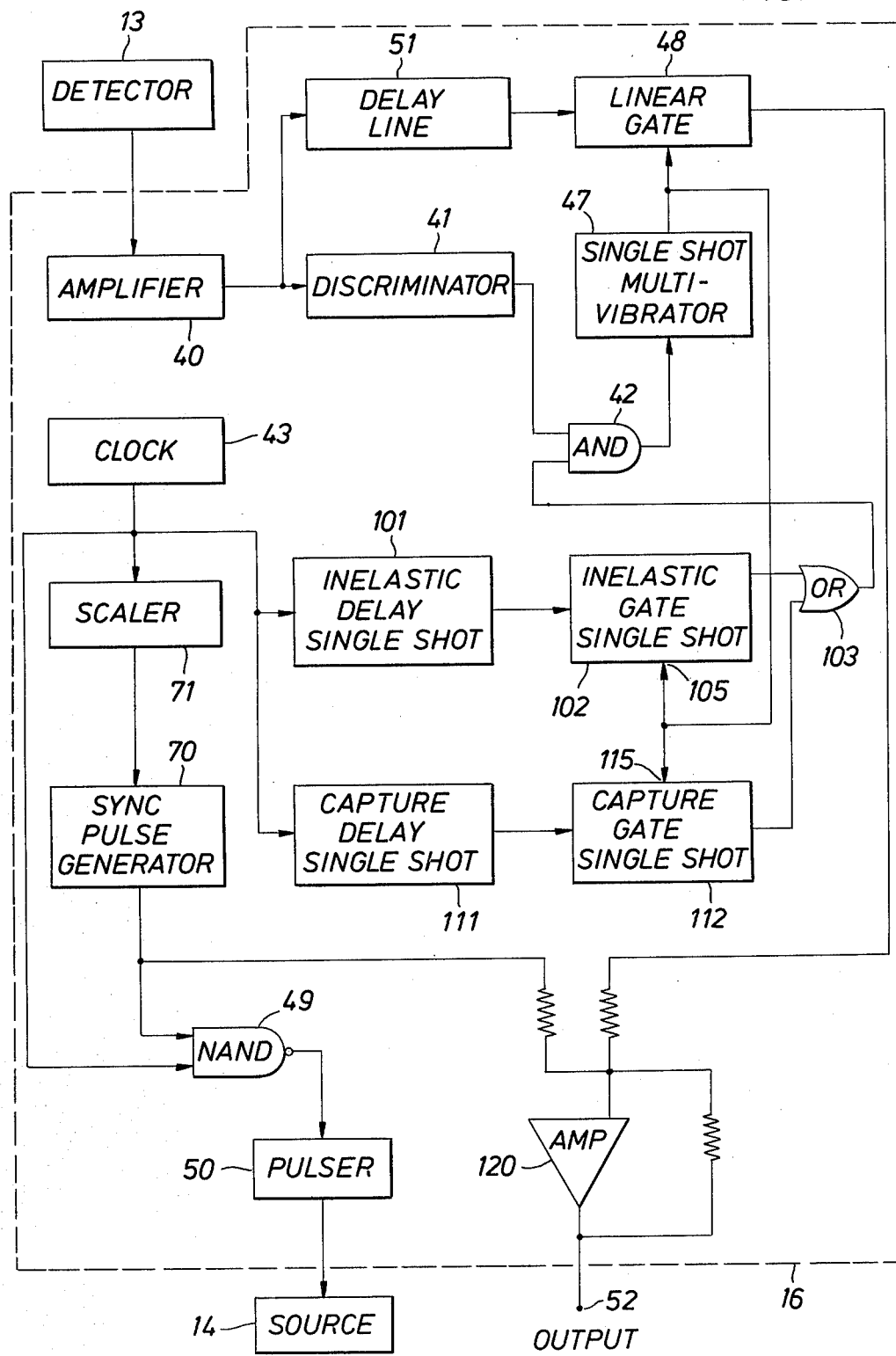
FIG. 2 is a block diagram of the subsurface circuitry according to the present invention.

Referring now to FIG. 2, there is illustrated in block diagram form, the subsurface electronics section 16 connected to the detector 13. The detector 13 is a scintillation counter arranged for gamma ray spectral analysis as is known in the art. In a preferred embodiment, detector 13 is a NaI (T1) crystal having a $2\frac{1}{8}$ inch diameter with a 4 inch length. The crystal is coupled to a photomultiplier tube such as the model No. 4523 available from The Radio Corporation of America. The described crystal-photomultiplier combination may give a resolution of 7.5% to 8.5% for the 660 key cesium 137 peak. To protect the detector from the high temperatures encountered in boreholes the detector may be mounted in a Dewar flask.

The output of detector 13 is coupled into an amplifier 40 within the subsurface electronics section 16. The output of amplifier 40 is coupled into a discriminator 41 which has an output coupled into one of the two inputs of AND gate 42. The discriminator 41 is used to remove pulses having amplitudes below a selectable threshold value which might otherwise cause pile-up on the transmission line normally connected to output terminal 52. A discriminator setting of 400 kev is generally suitable for this purpose. The output of the discriminator 41 is gated by AND gate 42 with a voltage pulse having a nominal width of ten microseconds coupled into the remaining input thereof from OR gate 103. The output signal from AND gate 42 triggers the single shot multivibrator circuit 47 which is nominally set to have a 1.6 microsecond wide pulse output for controlling the linear gate 48. The clock 43 output signal triggers the inelastic delay single shot multivibrator circuit 101 which in turn triggers the inelastic gate width single shot multivibrator circuit 102. These circuits synchronize the opening of linear gate 48 with the pulsing of the neutron source 14 to provide the inelastic gating interval. Multivibrator 102 is a reinitializing type with a reset input 105. The operation of the circuit is such that if a trigger pulse is applied to input 105 before the end of the cycle initiated by a previous trigger pulse, the cycle time will reset and begin anew. Also, after the circuit is initiated by a trigger pulse, the Q output signal of multivibrator 102 is coupled to one input of OR gate 103. The reset input 105 of single shot 102 is driven by the output of single shot 47. The result of this reset signal is to clear the inelastic gate single shot 102 as soon as the first gamma ray with energy above the discriminator threshold is detected. By using a multivibrator circuit with a reset function for gate single shot 102, a dual function is performed. Firstly, the single shot provides the gate width timing signal for determining the maximum length of the inelastic detection gate, nominally 10 μsec; and secondly it provides for terminating the gate when the first gamma ray pulse above the discriminator threshold is detected.

The output from clock 43 is also connected to the capture delay single shot 111 which in turn drives the capture width single shot 112 which also has a reset input 115 and whose output is coupled to the second input of OR gate 103. The reset input terminal 115 of single shot 112 is also driven by the output of single shot 47. The clock 43 output is also used to synchronize the neutron source 14. The pulse from clock 43 actuates, by means of NAND circuit 49, a high voltage pulser 50 arranged to cause the neutron output of source 14 to pulse at the clock frequency, for example, as described in U.S. Pat. No. 3,309,522.

The amplified pulses from amplifier 40 are also coupled into delay line 51, which is nominally set to cause a delay of 0.4 microseconds, the output of which is coupled into linear gate 48. The clock circuit 43 output is also coupled into a scaler circuit 71 which produces output pulses at a frequency scaled down from that of the clock frequency of 20 kHz with scaler circuit 71 producing pulses at a frequency of 200 Hz. The scaler 71 output is coupled into a sync pulse generator 70 which shapes the pulses for application to line amplifier 120 and NAND gate 49. Thus, the scaled sync pulses are generated at a frequency which is 1% of that of the clock 43 frequency. The scaled sync pulses from the sync pulse generator 70 are coupled into the second input of NAND gate 42. Thus, whenever a sync pulse appears on NAND gate 49 input coincident with a pulse from the clock circuit 43, there is no output produced from NAND gate 49 and the neutron source 14 is not pulsed. In short, source 14 pulses every time the clock 43 pulses except for those times when the scaled sync pulses are produced.

In addition to the scaled sync pulses, the output from linear gate 48 is coupled to line amplifier 120 which in turn is coupled to line 18 by connection to terminal 52.

In the operation of the circuitry of FIG. 2, it should be readily apparent that the circuits of multivibrators 111 and 112 are duplicates of the circuits of multivibrators 101 and 102. The difference lies in the time constant associated with each circuit which allows there to be two gating intervals which are separated in a preferred embodiment by a delay of approximately 25 microseconds from the beginning of the first to the beginning of the second. As will be explained hereinafter, the first gating interval occurs during the time the neutron source 14 is turned on and allows for the detection of radioactivity resulting from inelastic scattering and the second gating interval allows for the measurement of neutron capture resulting from the pulsing of the neutron source.

In the operation of the circuitry of FIG. 2, the first detector pulse exceeding the threshold of the discriminator 41 and commencing within the time interval of the gate pulse from OR gate 103 is passed by linear gate 48 to amplifier 120. Further, gating the 10 microsecond pulse from OR gate 103 with the discriminator 41 output through AND gate 42, provides the trigger for the single shot multivibrator. This controls the opening of the linear gate, rather than triggering the single shot multivibrator 47 from the discriminator 41 and gating the single shot multivibrator output and the OR gate pulse for the linear gate control signal. As a result, a detector pulse occurring near the end of the clock pulse interval is passed as a full width pulse instead of being chopped off as would otherwise occur. It should be noted that the multivibrator 102 is reset on the leading edge of the output pulse from multivibrator 47, disabling AND gate 42. Thus, only the first detector pulse occurring during the interval determined by multivibrator 102 is passed by the linear gate 48, with the pulse being outputted full width even when it occurs late within the clock interval.

As hereinabove set forth, the circuit associated with the second gating interval, i.e., discriminator 41, delay line 51 and multivibrators 111 and 112, operate substantially identically with that above described with a different time delay. Multivibrator 111, having a nominal time constant of 25 microseconds, enables the neutron capture radiation to be detected. As above described, only a single pulse is passed when pulses occurring within the 10 microsecond gate interval determined by multivibrator 112 are detected. These pulses are passed through the linear gate 48 to the amplifier 120 and the pulse output from linear gate 48 again is full width, even should it occur late within the gate interval.

Figure 3:
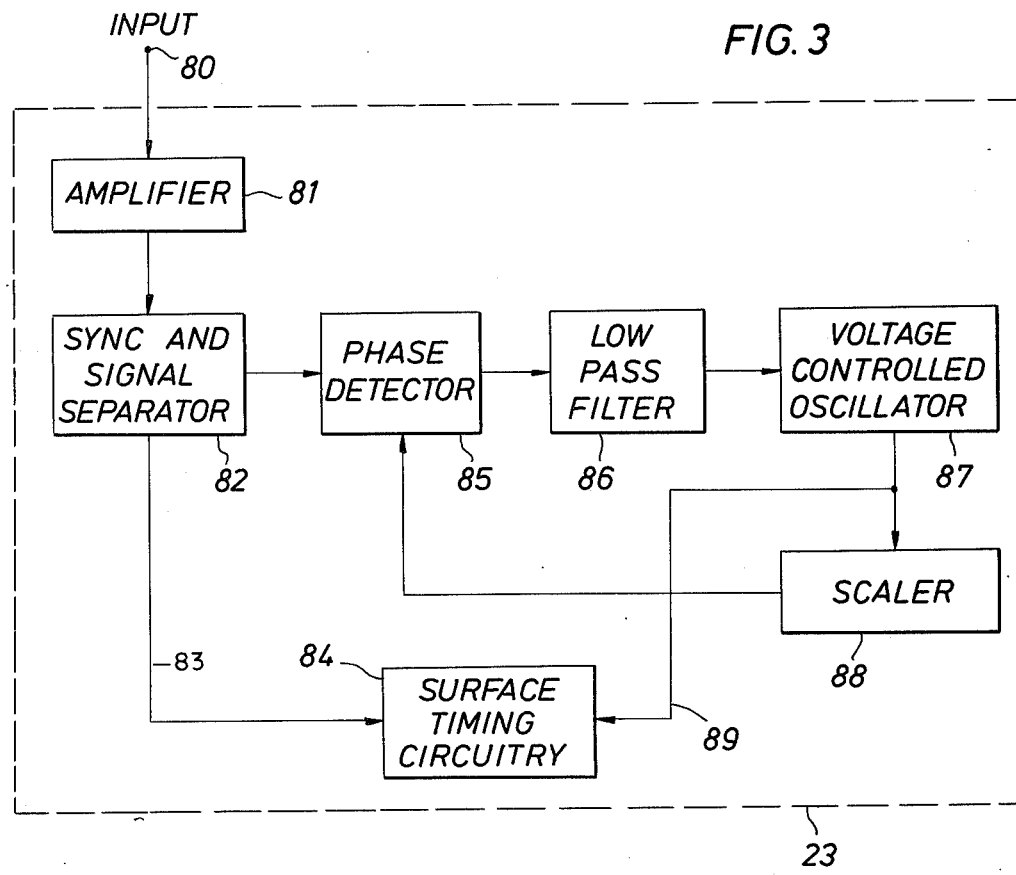
FIG. 3 is a block diagram of the surface circuitry according to the present invention.

Referring now to FIG. 3, the surface electronics circuitry 23 is illustrated in greater detail. Pulses from the logging cable are coupled through input terminal 80 into amplifier 81 whose output signal is coupled into a conventional sync and signal separator circuit 82. If the sync and signal pulses are of opposite polarity, they can be separated by polarity-sensitive circuitry and if they are of the same polarity, they can be separated by a voltage discriminator circuit well known in the art. In a preferred embodiment, the sync is transmitted with a polarity opposite from that of the detected pulses and the neutron source is not pulsed during the scaled sync transmission interval so that random coincidences do not annihilate the sync. If desired, the detector gate intervals can also be gated off during the sync transmission interval. The detector signals are coupled out of the sync and signal separator by conductor 83 into the surface timing circuitry 84 which is described in greater detail hereinafter.

The sync pulses from the sync and signal separator circuit 82 are coupled into a phase detector circuit 85, the output signal of which is coupled through a low pass filter 86 and into a voltage controlled oscillator 87. The output signal from the voltage controlled oscillator 87 is coupled into a scaler 88 and also into the surface timing circuitry 84 by conductor 89. The output of the scaler circuit 88 is coupled back into phase detector circuit 85.

In the operation, and still referring to FIG. 3, the combined sync and signal pulses are coupled into sync separator 82 where the sync pulses are separated and shaped to provide a reference frequency for the phase detector circuit 85. The phase detector output is filtered and used as the controlling voltage for the voltage controlled oscillator 87. The oscillator output is scaled by a frequency divider and coupled into the second input of the phase detector circuit 85. When the loop is in phase lock, the voltage controlled oscillator output frequency is equal to the product of the reference input frequency and the scaler ratio. Thus, if the subsurface system runs at a clock frequency of 20 kHz and the sync pulses are scaled and transmitted at a 200 kHz rate, a scaler of 100 (scaler 88) will provide a 20 kHz output from the voltage controlled oscillator. This 20 kHz signal, now in phase lock with the subsurface clock, provides the synchronization between the subsurface and the subsurface systems. Thus, it can be seen that this system extends the upper usable pulsing frequency while maintaining a fairly safe margin against random coincidence between the sync pulses and the signal pulses. The design criteria for phase-locked loop systems is well known and specially-designed integrated circuits are available for their implementation. See, for example, the *Phase-Locked Loop Data Book*, Second Edition, August, 1973, published by Motorola, Inc.

Figure 4:
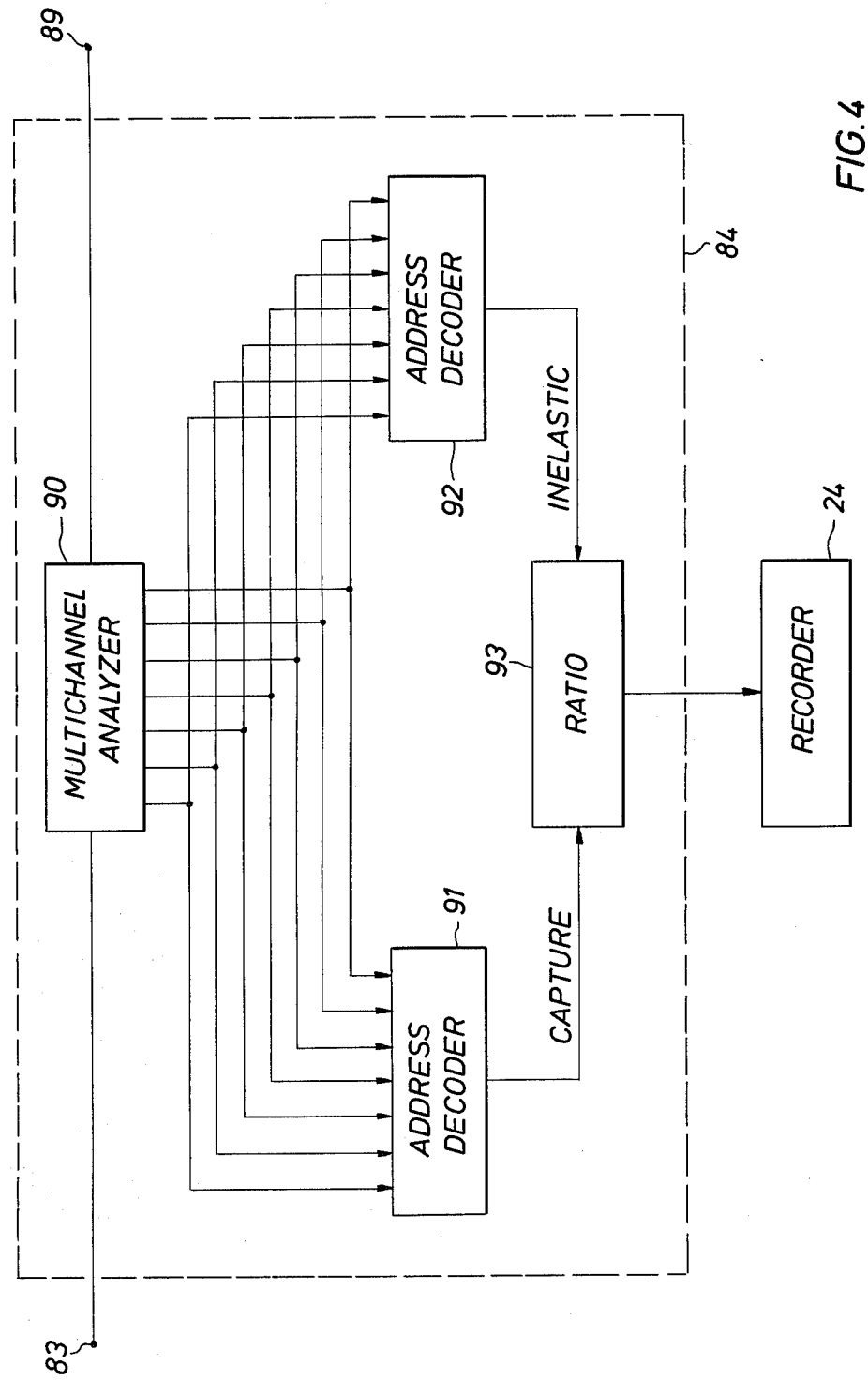
FIG. 4 is a block diagram showing in greater detail a portion of the surface circuitry of FIG. 3.

Referring now to FIG. 4, the surface timing circuitry 84 of FIG. 3 is shown in greater detail. The conductors 83 and 89, illustrated in FIG. 3, are coupled into a multichannel analyzer 90 having seven outputs which are each connected to two address decoders identified by the numbers 91 and 92, respectively. The outputs of the address decoders 91 and 92 are connected to a ratio circuit 93. The output of ratio circuit 93 is recorded by recorder 24.

Figure 5:
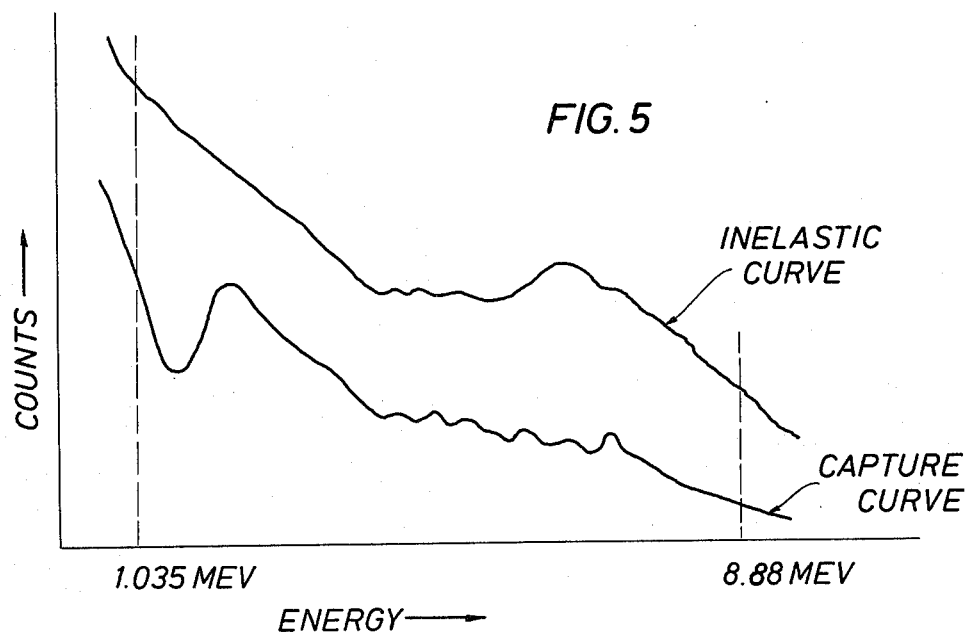
FIG. 5 graphically illustrates a spectral inelastic scattering curve and a spectral capture curve showing the energy window exemplary of the present invention.

The operation of the multi-channel analyzer and the address decoders is explained in greater detail in U.S. Pat. No. 4,013,874, issued on Mar. 22, 1977. In accordance with the present embodiment illustrated and described herein, the address decoder 91 is configured to measure pulses in the 1.035 to 8.88 Mev band of the capture spectrum. The address decoder 92 is configured to measure pulses in the 1.035 to 8.88 Mev band of the inelastic spectrum. The windows from the address decoders 91 and 92 are graphically illustrated in FIG. 5, which shows a typical neutron capture curve and a typical inelastically scattered neutron curve.

The output of address decoder 91 provides one input to ratio circuit 93 and the output of address decoder 92 provides a second input to ratio circuit 93. The capture/inelastic ratio is then recorded by recorder 24 providing a measurement of subsurface earth formation porosity.

Referring now to FIG. 6, the graphic data illustrates how the capture spectra/inelastic spectra ratio, as derived in test pits of known porosity and lithology, relates to formation porosity. The ordinate represents the capture/inelastic ratio, as hereinbefore described, while the abscissa represents formation porosity. The data indicates that the capture/inelastic ratio is substantially independent of formation lithology. This independence is indicated by the close coincidence of the limestone curve 94 to the sandstone curve 95. The test data illustrates that the maximum error resulting from formation lithology is five percent for porosities between 10% and 20% and six percent for porosities between 20% and 30%.

FIG. 6 further indicates that the capture/inelastic ratio is substantially independent of borehole influences, such as borehole size. Data points derived from a borehole of 5-½ inches in diameter are illustrated by the triangular symbol, while data points derived from a borehole having a twenty percent diameter increase, to 6-⅜ inches in diameter, are indicated by the circular symbol. The data illustrates no substantial difference resulting from borehole size.

In an alternate embodiment of the present invention, instead of deriving the porosity measurement from a ratio of the capture spectra to inelastic spectra within the described energy range, the ratio utilized is of the capture spectra, within the described range of 1.035 Mev to 8.88 Mev, to the capture plus inelastic spectra within the same energy range. Those skilled in the art will recognize that a capture plus inelastic spectra is the equivalent of the total radiation spectra. FIG. 7 graphically illustrates the substantial independence of the capture/(caputre+inelastic) ratio to the influences of formation lithology and borehole size.

Thus, there has been described and illustrated herein a system in accordance with the present invention wherein a new and improved method and apparatus are described which provides direct porosity data which is substantially insensitive to borehole influences and formation lithology. However, those skilled in the art will recognize that obvious modifications can be made to the preferred embodiments without departing from the spirit of the invention.

The embodiments of the invention in which an exclusive property of privilege is claimed are defined as follows:

1. A method of well logging for deriving measurements of porosity substantially independent of lithology, comprising the steps of:
   irradiating the formations surrounding a borehole with high energy neutrons;
   detecting radiations emanating from said formations being irradiated by said neutrons;
   generating first electrical signals based upon said detected radiations having energies including substantially the entire energy range of said detected radiations resulting from the capture of said neutrons;
   generating second electrical signals based upon said detected radiations having energies including substantially the entire energy range of said detected radiations resulting from the inelastic scattering of said neutrons; and
   generating third electrical signals functionally related to the combination of said first and second electrical signals.

2. The method of claim 1 wherein said step of generating said first electrical signals includes the step of detecting gamma radiations within a single preselected energy range interval resulting from neutron capture.

3. The method of claim 2 wherein said step of generating said second electrical signals includes the steps of detecting gamma radiation within a single preselected energy range interval resulting from the inelastic scattering of said neutrons.

4. The method of claim 3 wherein the steps of generating said first and second electrical signals includes the steps of:
   generating said first electrical signals responsive to said detected capture gamma radiation having energies from between 1.035 Mev and 8.88 Mev; and
   generating said second electrical signals responsive to detected inelastic scattered gamma radiation having energies from between 1.035 Mev and 8.88 Mev.

5. The method of claim 4 wherein the step of generating said third electrical signals includes the step of combining said first and said second electrical signals to form a ratio of said detected radiation resulting from said neutron capture to said detected radiation resulting from inelastic scattering of said neutrons.

6. A method of determining the porosity of subsurface formations, comprising the steps of:
   irradiating said formations with neutrons of an energy level sufficient to induce inelastic scattering and capture gamma ray production;
   detecting capture gamma rays and inelastic scattered gamma rays emanating from said irradiated formations;
   generating first electrical signals responsive to said detected capture gamma radiation having energies consisting of substantially the total energy spectrum of detected capture gamma radiation;
   generating second electrical signals responsive to said detected inelastically scattered gamma radiation having energies consisting of substantially the total energy spectrum of detected inelastically scattered gamma radiation; and
   combining said first and second electrical signals to form a ratio functionally related to substantially the total energy spectrum of detected capture gamma radiation to substantially the total energy spectrum of detected inelastically scattered gamma radiation to provide a third electrical signal representative of said formation porosity.

7. The method of determining porosity of claim 6 wherein the step of generating said first electrical signals includes measuring detected capture gamma radiation comprising the energies between 1.035 Mev and 8.88 Mev.

8. The method of determining porosity of claim 7 wherein the step of generating said second electrical signals includes measuring detected inelastically scattered gamma radiation comprising the energies between 1.035 Mev and 8.88 Mev.

9. Apparatus for determining the porosity of the formations surrounding a borehole, comprising:
an elongated logging instrument for tranversing a borehole;
a source of high energy neutrons within said instrument for irradiating regions surrounding said instrument;
gamma ray detector means in spaced relation to said source for detecting radiations resulting from the capture of said neutrons and radiations resulting from the inelastic scattering of said neutrons;
circuit means for generating first electrical signals indicative of substantially all said detected radiations within the capture energy range;
circuit means for generating second electrical signals indicative of substantially all said detected radiations within the inelastic scattering energy range; and
circuit means for combining said first electrical signals and said second electrical signals to provide a measurement of the porosity of said formations.

10. The apparatus according to claim 9, wherein said capture energy range is from approximately 1.035 Mev to approximately 8.88 Mev and said elastic scattering energy range is from approximately 1.035 Mev to approximately 8.88 Mev.

11. A method of determining the porosity of subsurface earth formations penetrated by a borehole, comprising the steps of:
pulsatingly irradiating said formations with neutrons;
detecting radiations emanating from said formations being irradiated;
generating first electrical signals responsive to substantially all the detected capture gamma radiation spectra, said capture gamma radiation having energies from between approximately 1 Mev to approximately 9 Mev;
generating second electrical signals responsive to the combination of substantially all said detected capture gamma radiation spectra and substantially all of the detected inelastic scattered gamma radiation spectra, said capture gamma radiation having energies from between approximately 1 Mev to approximately 9 Mev and said inelastic scattered gamma radiation having energies from between approximately 1 Mev to approximately 9 Mev; and
combining said first and second electrical signals to provide an indication of the porosity of said formations.

* * * * *